Dec. 12, 1950     D. P. KEEFE     2,534,132
PHOTOGRAPHIC APPARATUS

Filed June 22, 1948     6 Sheets-Sheet 1

FIG. I

DAVID P. KEEFE,
By
Attorney

Dec. 12, 1950 D. P. KEEFE 2,534,132
PHOTOGRAPHIC APPARATUS
Filed June 22, 1948 6 Sheets-Sheet 2

Inventor
DAVID P. KEEFE,

By
ATTORNEY

Dec. 12, 1950 D. P. KEEFE 2,534,132
PHOTOGRAPHIC APPARATUS
Filed June 22, 1948 6 Sheets-Sheet 3

Inventor
DAVID P. KEEFE,
By Harold Killmeyer
Attorney

Dec. 12, 1950   D. P. KEEFE   2,534,132
PHOTOGRAPHIC APPARATUS
Filed June 22, 1948   6 Sheets-Sheet 4

Inventor
DAVID P. KEEFE,
By Harold Gilcoyne
Attorney

Dec. 12, 1950  D. P. KEEFE  2,534,132
PHOTOGRAPHIC APPARATUS
Filed June 22, 1948  6 Sheets-Sheet 5
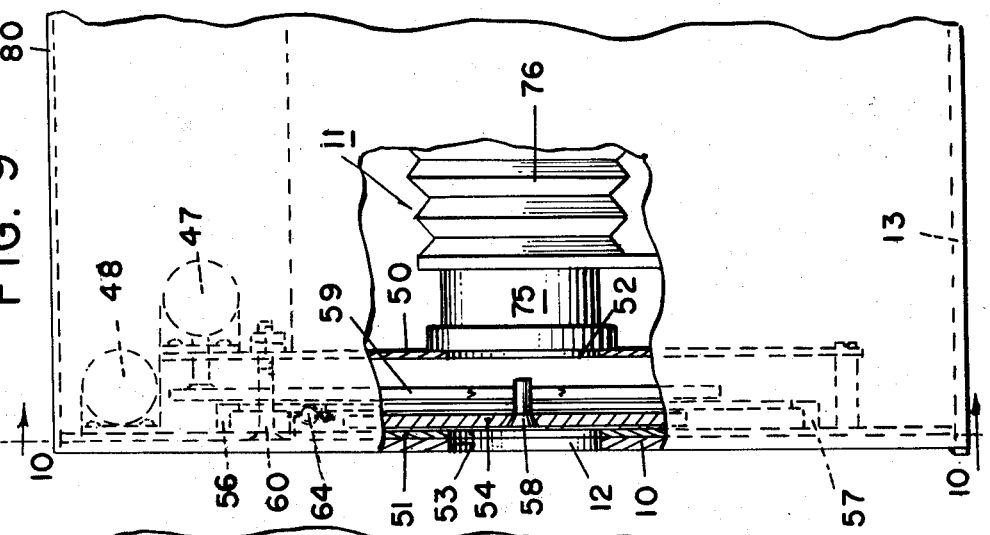
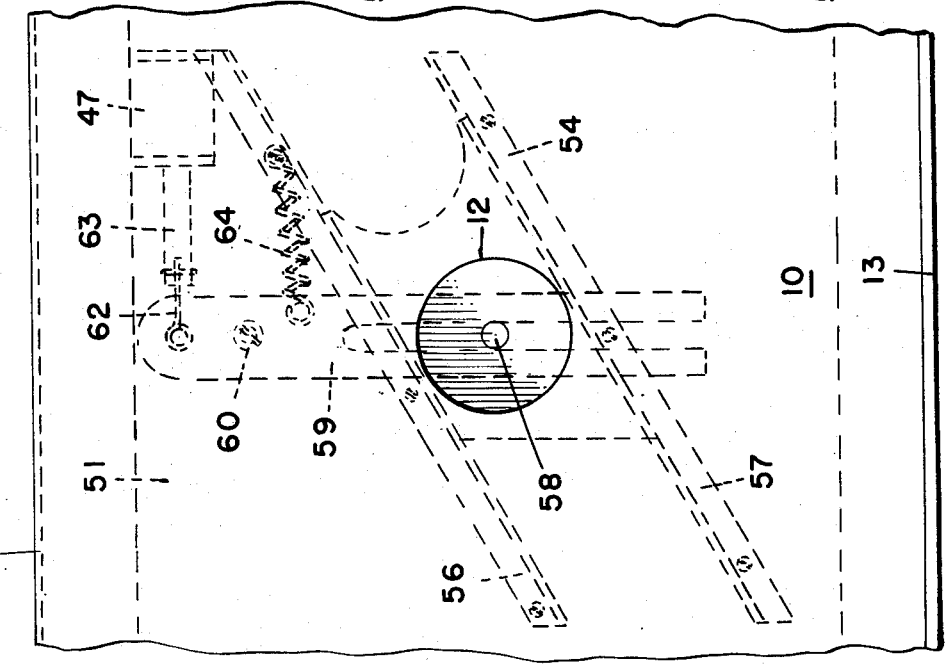
Inventor
DAVID P. KEEFE,
By Harold Kilcoyne
ATTORNEY Dec. 12, 1950 D. P. KEEFE 2,534,132
PHOTOGRAPHIC APPARATUS
Filed June 22, 1948 6 Sheets-Sheet 6
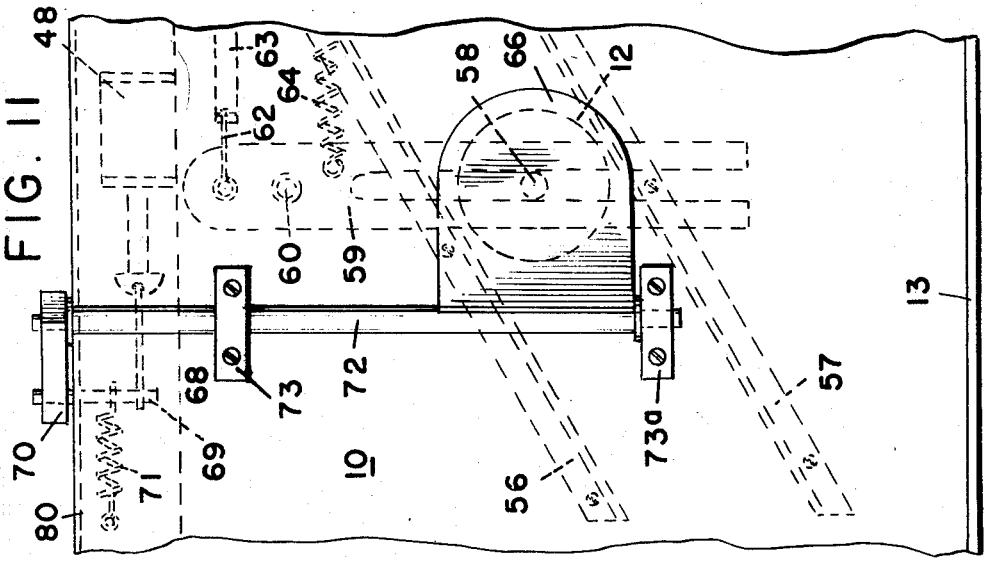
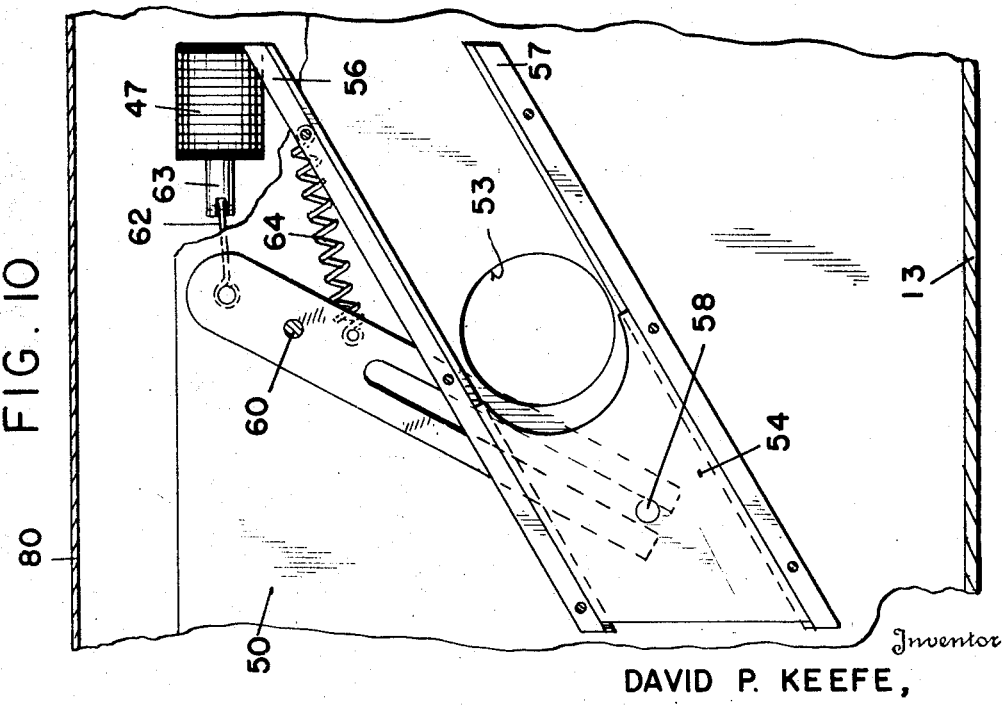
Inventor
DAVID P. KEEFE,
By
ATTORNEY Patented Dec. 12, 1950

2,534,132

UNITED STATES PATENT OFFICE 2,534,132

PHOTOGRAPHIC APPARATUS

David P. Keefe, Marblehead, Mass.

Application June 22, 1948, Serial No. 34,395

13 Claims. (Cl. 273—102.2)

This invention relates to improvements in photographic apparatus and, with regard to its more specific aspects, to a target-controlled camera for effecting camera actuation in response to a hit on the target. While especially designed for and hereinafter described in its application to shooting galleries of the type common to beach resorts, carnivals, fairs and the like, to take a picture of a person substantially in the act of firing at the target, responsively to a hit on the bull's eye or other selected point of the target, it will be understood that apparatus in accordance with the invention is not so limited but, rather, that it has wider application to the fields of commercial photography and of home amusement devices, to teaching the art of rifle shooting, and the like.

Stated broadly, the invention contemplates and aims to provide an improved photographic apparatus in the form of a camera-target combination which incorporates automatically operating means for effecting camera actuation, i. e. exposure, responsively to a target hit, thereby causing the camera to take a picture of the person firing at the target substantially in the act of firing. To properly illuminate the person being photographed, the invention provides illuminating means directed on the subject and which is energized by said actuating means in properly timed relation to camera actuation so as to provide the necessary illumination at the instant of camera exposure.

Another principal aim of this invention is the provision in photographic apparatus of the type specified of simple yet effective electro-mechanical means for automatically translating a target hit into camera actuation and which also functions to provide the necessary illumination as to enable a clear picture of a person firing at the target to be taken.

Yet another important object of the invention is the provision of photographic apparatus of the stated character, including automatically operating means for effecting actuation of a camera focused on a person firing at a target and for illuminating the person firing, wherein the operation of said means is timed to effect energization of the illuminating means immediately prior to and during the instant of camera actuation.

More detailed objects of the invention are the provision of a photographic apparatus of the specified character wherein the camera is fully protected against damage by the projectile being fired; the provision of a target-controlled camera for use in shooting galleries and the like, which is characterized by a design and construction such that it may be readily installed in the conventional shooting gallery layout, and which is further characterized by thoroughly dependable operation and by inexpensive maintenance, and which satisfies the purposes for which it was intended in fully effective manner.

The above and other objects and features of advantage of photographic apparatus according to the invention will appear from the following detailed description thereof, taken with the accompanying drawings illustrating one physical embodiment of the invention, in which:

Fig 8 is an enlarged broken-away front view looking into the camera front, the protective flap being removed and the shutter and its actuating means being shown in dotted lines;

Fig. 9 is a broken-away, part-sectional side elevation of the camera front portion;

Fig. 10 is an enlarged, part-sectional view taken along line 10—10 of Fig. 9; and Fig. 11 is an enlarged, broken-away view of the guard plate, showing the protective flap mounted thereon in its closed position, and the operating means therefor being shown partly in dotted lines.

Figure 1:
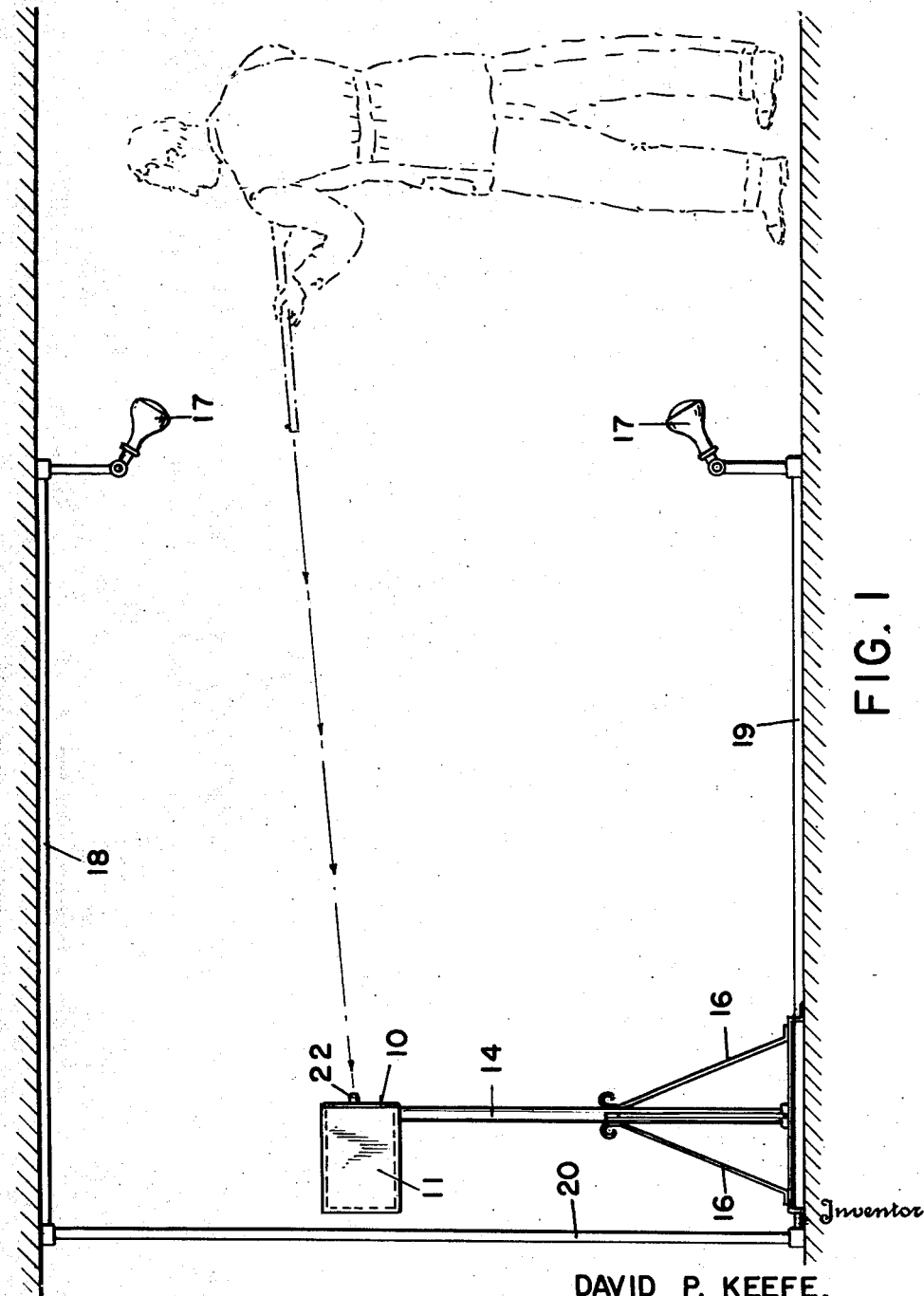
Fig. 1 is a side elevation of the camera-target combination of the invention as installed in a typical shooting gallery lay-out.

Referring to the drawings wherein like reference characters designate like parts throughout the several views, reference character 10 designates a combined target and camera guard plate of heavy-guage metal, and mounted rearwardly of the guard plate is a camera 11 to be hereinafter more fully described. As seen in Fig. 2A the guard plate is provided with a centrally disposed opening 12 which is aligned with the light opening provided in the camera front and through which light may pass to the camera. The camera 11 is supported on a horizontal shelf 13 (Figs. 3, 4 and 5) affixed to and extending rearwardly from the guard plate 10, it being observed from Figs. 2 and 3 that the camera is displaced laterally from the target and hence out of the direct line of fire thereto, such displacement further resulting in the picture being taken at a slight angle to the person firing at the target rather than in full, front view. The combined target and guard plate, and the camera supported therefrom, are preferably disposed at about head level, being secured to a standard 14 as by means of an attaching bracket 15 (Fig. 2), the standard being held vertical by a tripod base whose inclined supporting legs 16 are preferably lagged to the floor of a shooting gallery or like enclosure.

Illuminating means shown to comprise upper and lower pairs of photo-flood lamps 17 are disposed and directed forwardly of the camera and are suitably supported from floor and ceiling conduits 18, 19 connected by a vertical cable conduit 20, said conduit carrying the electrical conductors which supply energy to the lamps. As will hereinafter appear, the lamps are normally deenergized, but are automatically energized in response to a target hit to illuminate the person making the hit.

Figure 2:
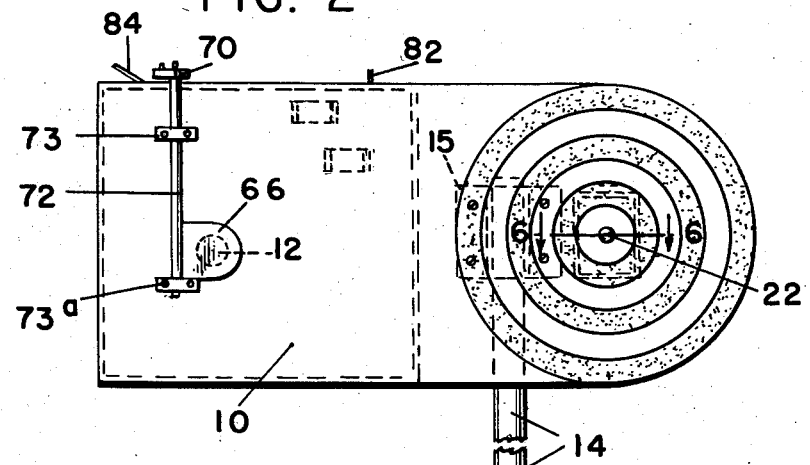
Fig. 2 is a broken-away front view of the camera-target combination illustrated in Fig. 1.
Figure 2A:
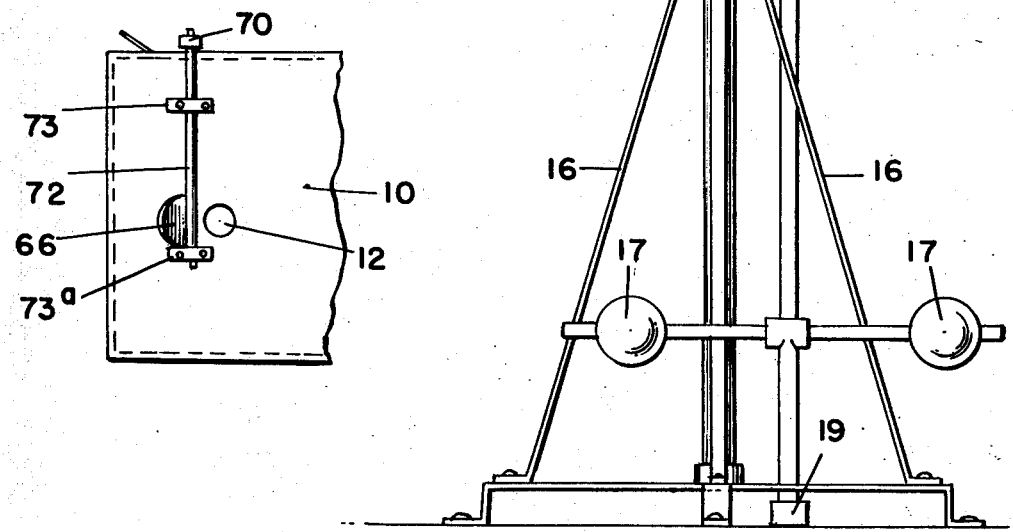
Fig. 2A is a detail view illustrating the protective flap which normally covers the guard plate opening in its open position.
Figure 3:
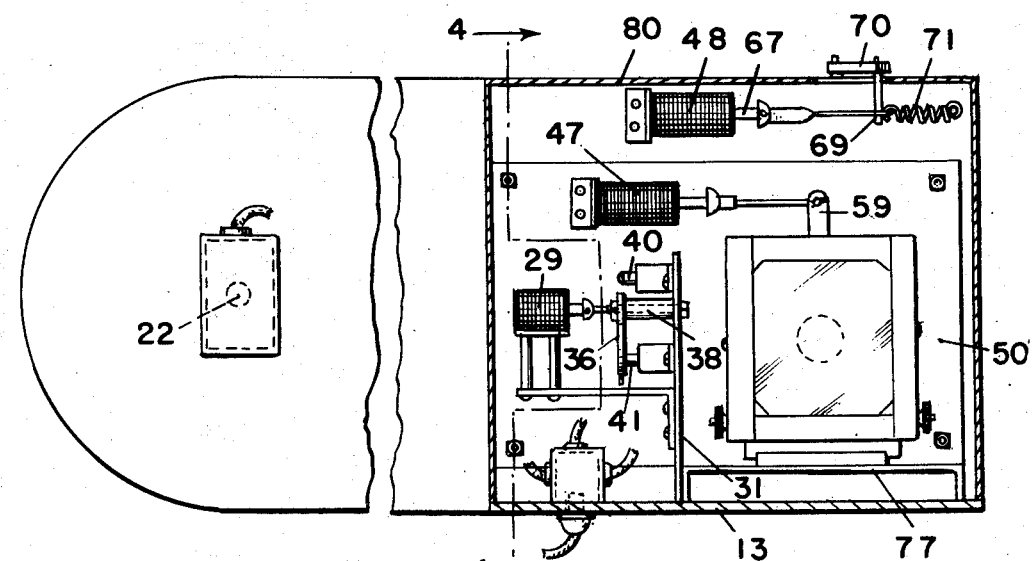
Fig 3 is an enlarged rear view of the camera-target combination, with camera cover broken away to show the camera in rear elevation and to generally illustrate the array of parts associated with the camera for effecting its operation.
Figure 6:
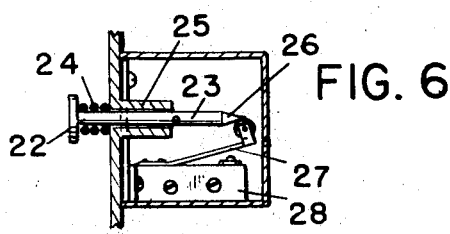
Fig. 6 is a section taken through the target switch taken on line 6—6 of Fig. 2.

As seen in Fig. 2, the target portion of the plate 10 is marked with concentric circles which may be suitably colored for scoring purposes, the bull's eye circle of the target being defined by the enlarged circular head 22 of a plunger 23 (Fig. 6) which is biased by an encircling spring 24 normally to project the head a short distance forwardly of the front face of the target plate. The plunger has sliding bearing in a sleeve 25 affixed to the rear face of the target plate, and its rear end is shown to terminate in a point 26 engaging the spring arm 27 of a normally open switch 28 of the instantaneous or so-called micro type, hereinafter referred to as the target switch. From the construction so far described, it will be observed that a hit on the bull's eye 22 by a projectile such as a lead pellet fired from an air gun, for example, will temporarily depress and thereby close the switch 28, the resulting compression of spring 24 thereupon returning the bull's eye to its normal position and opening said switch.

Target switch 28 is an element of electro-mechanical means herein provided for translating a hit on the bull's eye into camera actuation, and to this end is series-connected to a trip solenoid 29 mounted on a bracket 30 extending from a vertical panel 31 disposed to the side of the camera (Figs. 3 and 4) and affixed to the shelf 13. The armature 32 of the solenoid is provided at its free end with a detent 33, and is encircled by a spring 34 normally biasing the detent to its out or active position, energization of the solenoid retracting the detent against the tension of said spring.

Figure 4:
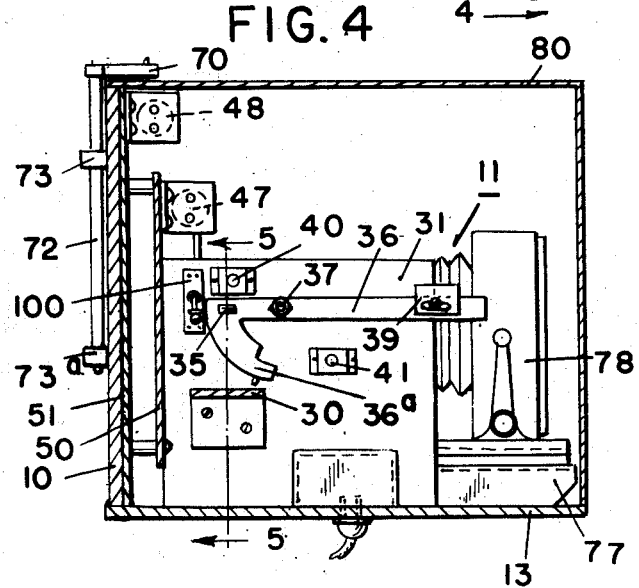
Fig. 4 is a section taken along line 4—4 of Fig. 3.
Figure 5:
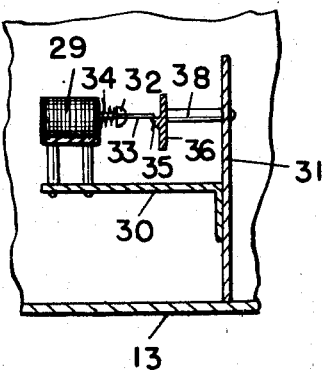
Fig. 5 is a section taken along line 5—5 of Fig 4.

In its active position, detent 33 engages a keeper 35 (Fig. 5) of a timing arm generally designated 36 (Figs. 4 and 7) and thereby latches the timing arm in its normal or inactive position. As best seen in Figs. 4 and 5, the timing arm 36 is pivoted intermediate its ends for swinging movement about a fulcrum point 37, which may be provided by a horizontal stud 38 mounted on the vertically disposed panel 31. Preferably, the fulcrum point is disposed closer to the left or keeper end of the timing arm than to its other end whereby said arm is unbalanced, and hence tends to swing in a clockwise arc (Figs. 4 and 7) under the weight of its longer end upon retraction of the detent 33. To insure positive swinging motion of the timing arm, its longer end may carry a counter-weight 39, as shown.

Arranged in the path of movement of the shorter end of the timing arm is a normally open switch 40, preferably of the instantaneous or so-called micro-type, and arranged in the path of movement of the longer end of the arm is a normally open switch 41 of similar type. Both of the switches 40, 41 may be and are preferably affixed to the outer face of the panel 31 in position so as to be brushed and hence closed by the arm in its clockwise movement. It will be observed that with switches 40, 41 disposed on the same radius from fulcrum point 37, switch 40 is disposed somewhat closer to the upper edge of the timing arm than is switch 41 to the lower edge of said arm. Accordingly, clockwise movement of the timing arm results in closing of the switch 40 a short time interval prior to closing of the switch 41.

Figure 7:
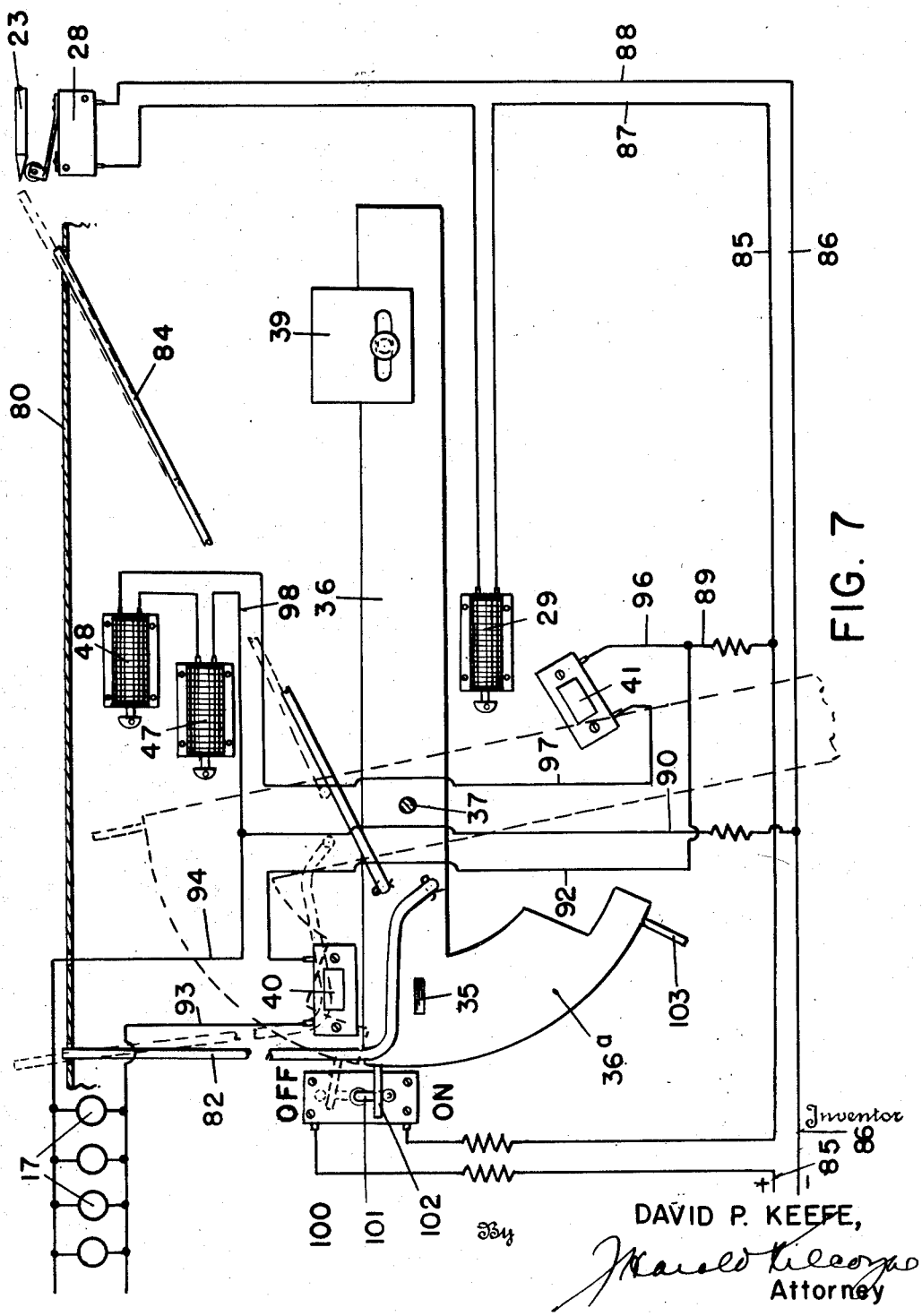
Fig. 7 is an enlarged, part-diagrammatic view of the timing arm generally illustrating the switches and circuits controlled thereby.

As best seen in Fig. 7, the shorter end of the timing arm is formed with a depending arcuate extension 36a disposed on the radius of switch 40, and having adequate arcuate length as to maintain contact with said switch until the longer end of the arm moves past switch 41. Accordingly, a circuit (the lighting circuit to be described), which is controlled by switch 40, is closed during the interval of closing of switch 41. Also, by reference to Fig. 7, the timing arm may continue its swinging movement until it reaches its dotted line position shown, in which it is stopped by a rubber block or similar stop means (not shown). In its dotted line position, the timing arm is disengaged from both switches 40, 41 which are accordingly open.

The first-to-close and last-to-open switch 40 is connected into one of the supply conductors for the photo-flood lamps 17 which are parallel-connected across said conductors as is usual, and swich 41 is connected into one of the conductors supplying current to two series-connected solenoids 47, 48 which control opening of the camera shutter and of an armored protective flap associated with the guard plate 10, respectively. Referring to Figs. 3, 8, 9 and 10, the shutter solenoid 47 may be affixed to the rear face of a vertical front panel 50 secured to and spaced a small distance rearwardly of the camera main front 51, the panel and camera front being provided with registering light openings 52, 53, respectively, which are in turn aligned with the light opening 12 of the guard plate 10.

According to the invention, energization of the solenoid 47 results in movement of the shutter designated 54 from its normal position in which it covers opening 53 in the camera front, to an opening uncovering position. To this end, the shutter takes the form of a sliding plate disposed just to the rear of the camera front, and is mounted to slide in inclined ways or guides 56, 57 which may be secured to the rear face of the camera front to extend rearwardly therefrom in the space between the front and the panel 50. Secured to the rear face of the shutter is a stud 58 operating in a slot formed by the forked ends of a normally vertically disposed lever 59 fulcrumed intermediate its ends as at 60 to the camera front 51. A link 62 connects the upper end of the lever with the plunger 63 of the solenoid, and a spring 64 anchored at its one end to a fixed point on the camera front is connected at its other end to the lever 59 at a point below its fulcrum 60. Upon solenoid 47 being energized, plunger 63 is retracted, causing lever 59 to turn in clockwise direction (Fig. 8), and its lower forked end to impart downward sliding movement to the shutter through stud 58 against the bias of spring 60. Such movement is calculated to cause the upper end edge of the shutter, which may be formed semi-circular, to clear and uncover camera front opening 53. When the solenoid 47 is deenergized, spring 64 operating through lever 59 effects return of the shutter 54 to its covering position and also effects retraction of the solenoid plunger.

The above referred to protective or guard flap is designated 66 (Figs. 2A and 11) and its disposed forwardly of the camera guard plate 10 so as normally to cover the opening 12 therein. The flap, like the guard plate 10, is made from heavy-gauge metal and serves to protect the shutter and camera lens against damage from a mis-aimed projectile which could otherwise pass through said opening 12. According to the invention, the flap 66 is automatically moved to uncovering position in response to energization of solenoid 48, such flap movement being effected as follows: Solenoid 48 is preferably mounted on the rear face of the camera main front 51 and above the front panel 50. Its armature 67 is connected through link 68 with a pin 69 depending from a crank 70, said pin also anchoring one end of a spring 71 operative to resist angular movement of the pin and crank in response to pull thereon applied by the retracting movement of the armature 67. The crank 70 is affixed to the upper end of a vertically disposed rock shaft 72 journaled in bearings 73, 73a secured to the front face of the guard plate 10, and the flap 66 is carried by the lower end of said rock shaft. Spring 71 normally maintains the flap 66 in the position illustrated in Fig. 11, wherein it covers the guard plate opening 12. However, upon solenoid 48 being energized, its armature 67 is retracted against the bias of spring 71 and shaft 72 is accordingly rocked through an arc exceeding 90°, thereby to actuate the flap 66 to its uncovering position shown in Fig. 2A.

The camera 11 may be of conventional type incorporating a lens 75 which is disposed in substantially light-tight engagement against the front panel 50 and aligned with the light opening 52 thereof, and a bellows 76. Said parts are carried by a camera bed 77 which also mounts the camera back 78, the bed being detachably mounted on the shelf 13. The camera back 78 is preferably of the type providing for loading and removal of a photographic plate, a film pack or a pack of positive print paper, the latter being preferred for shooting gallery application, due to its quick-developing properties. The camera and electro-mechanical actuating parts mounted on or from the shelf 13 are suitably enclosed as by a dust-cover 80 which may be a four-sided rectangular hood made from sheet metal, the open bottom of the cover being closed by the shelf 13, and the open front by the rear face of the guard plate 10.

To provide the operator with an indication of timing arm position, a light-weight angular rod 82 is shown in Fig. 7 to be connected at its one end to the shorter end of the timing arm 36 (Fig. 7), its other end extending a short distance through an opening in the top wall of the dust-cover when the arm is in its normal or inactive full-line position. Angular movement of the timing arm to its dotted line position results in projection of the upper end of the rod 82 a substantial distance above the cover top wall, such providing a tell-tale or indication that the timing arm has completed its angular movement and that it requires re-setting for another cycle.

Resetting of the timing arm 36 may be simply effected by a resetting rod 84 having its one end also connected to the shorter end of the arm, and its other end extending through an opening in the cover top wall. Angular movement of the timing arm to its dotted line position projects the extending end of the rod well above the dust-cover. To reset the arm, the rod 84 is pushed axially to apply downward thrust on the shorter end of the timing arm. The arm is accordingly swung in counter-clockwise direction to its normal or full-line position, in which it is latched by detent 35 of the trip solenoid 29.

The electrical wiring connections which were omitted for clarity in the other views are shown diagrammatically in Fig. 7. In said view, reference numerals 85, 86 designate the supply mains which supply current to the conductors 87, 88 of a branch circuit containing the target switch 28 and the trip solenoid 29, the same being series-connected in the circuit. The switches 40, 41 are connected in parallel branch circuits supplied by conductors 89, 90 connected across said mains, the parallel branch circuits being traced as follows: Conductors 89 and 92, switch 40, conductor 93, flood lamps 17, conductor 94 and return conductor 90; and conductors 89 and 96, switch 41, conductor 97, solenoids 49 and 48, conductor 98 and return conductor 90. It will be noted that solenoids 48, 49 are series-connected so that they are simultaneously energized and de-energized by switch 41.

Although the supply mains 85, 86 may be opened and closed by a manually controlled main switch under the control of the operator, it is within the purview of the invention to provide automatic means responding to timing arm movement for effecting opening and closing of the supply mains. Such automatic means as shown in Fig. 7 includes a toggle switch 100 which is connected in one of the supply mains 85. The toggle switch may be mounted on the side panel 31 so that its toggle arm 101 extends into the path of movement of pins 102, 103 extending from the edge of the arcuate timing arm extension 36a. Said pins are so positioned that the upper pin 102 engages the toggle arm 101 of the control switch to move same to its switch closing position upon the timing arm lowering to its normal or full-line position, and that the lower pin 103 engages the toggle arm to move it to its switch opening position as the timing arm completes its angular movement, i. e. assumes the dotted line position. From the above, it will be observed that when the timing arm is in its normal full-line position, the circuits controlled by switches 28, 40 and 41 are conditioned for closing in response to a hit on the bull's eye, and that following angular movement of the timing arm to its dotted line position, all circuits are open, with manual resetting of the timing arm as results in closing of main switch 100 being required to again condition the aforesaid switch controlled circuits for closing in response to a hit on the bull's eye.

Briefly summarizing the operation of the target-controlled camera as described in a shooting gallery, it will be assumed that the camera 11 is focused on the person firing at the target, and that the photo-flood lamps 17 are positioned to direct illumination on said person when energized. A person standing in the firing position aims at the bull's eye constituted by the circular head 22 of plunger 23. A hit on the bull's eye by the lead pellet being fired temporarily depresses said plunger which effects closing of the target switch 28 and retraction of detent 33 which normally holds timing arm 36 in its inactive position. Upon detent retraction, timing arm 36 swings in clockwise direction under the greater weight of its longer end and counterweight 39, if provided.

In such movement, the shorter end of the timing arm, which moves upwardly, brushes against switch 40 to complete an electrical circuit for the photo-flood lamps 17 which are accordingly energized during the time interval that the shorter end of the timing arm and its arcuate extension 36a engage said switch. During said interval, the longer end of the timing arm, which moves downwardly, brushes against switch 41, thus completing an electrical circuit through the solenoids 47 and 48, which, upon being energized, effect opening of the camera shutter 54 and of the guard flap 66, respectively, thereby to expose the light-sensitive medium contained in the camera, it being understood that the shutter and guard flap are open only during the short interval that the timing arm is pressing on the switch 41. Continued angular movement of the timing arm results in the arm traveling past said switches 40, 41, whereupon said switches automatically open, the lights are de-energized and the shutter and the guard flap close. The lever continues its rotation until stopped by the stop means (not shown). At this point, the lower pin 103 on the shorter end of the arm engages the arm 101 of toggle switch 100 and moves same to "off" position, with the result that the electrical system is now completely de-energized.

The operator now removes the plate, film or positive print paper which has been exposed from the camera back for developing and/or printing and replaces it with an unexposed sensitive element. Finally, the operator resets the timing arm in its normal or inactive position, whereby detent 33 engages the keeper 35 thereof to latch the arm in that position. As the shorter end of the timing arm has lowered in its resetting, the upper pin 102 thereof has lowered sufficiently to engage the toggle arm 101 of switch 100, moving same to its "on" position, and conditioning all of the switch controlled circuits for closing in response to a hit on the bull's eye. Accordingly, the sequence is now complete and the apparatus is ready for another cycle of operation.

As many changes could be made in carrying out the above construction without departing from the scope of the invention, it is intended that all matter contained in the above description or shown in the accompanying drawing shall be interpreted as illustrative and not in a limiting sense.

I claim:

1. Apparatus of the character described comprising, in combination, a target, a camera focused on a person firing at the target, shutter means for the camera including a normally closed shutter and means for opening the shutter, normally de-energized illuminating means directed on said person, and electro-mechanical means responsive for its actuation to a target hit and being operative to energize said illuminating means and to actuate said shutter opening means in predetermined timed relationship, said last means including an arm mounted for angular movement from an inactive position, latching means normally operative to secure said arm in its inactive position, and a target-controlled switch for rendering said latching means ineffective.

2. Apparatus of the character described comprising, in combination, a target, a camera focused on a person firing at the target, shutter means for the camera, normally de-energized illuminating means directed on said person, and electro-mechanical means responsive to a target hit for energizing said illuminating means and for actuating said shutter means in predetermined timed relationship including an arm mounted for swinging movement from an inactive position, latching means normally operative to secure said arm in its inactive position, a target-controlled switch for rendering said latching means ineffective, and a plurality of normally open switch means disposed in the path of movement of said arm and adapted to be individually closed by said arm during its swinging movement, one of said switch means controlling energization of said illuminating means, and another switch means controlling actuation of the shutter means.

3. Apparatus of the character described comprising, in combination, a target, a camera focused on a person firing at the target, shutter means for the camera, normally de-energized illuminating means directed on said person, means responsive to a target hit, a timing arm mounted for angular movement, means controlled by said last means for initiating angular movement of the arm, and said arm being operative during its angular movement first to effect energization of said illuminating means and thereafter actuation of said shutter means in predetermined timed relationship.

4. Apparatus of the character described comprising, in combination, a target, a camera focused on a person firing at the target, shutter means for the camera including a normally closed shutter and means for opening the shutter, normally de-energized illuminating means directed on said person, detent means responsive to a target hit, and an angularly movable timing arm whose movement is controlled by said detent means for effecting energization of said illuminating means and for actuating said shutter opening means in predetermined timed relationship.

5. Apparatus of the character described comprising, in combination, a target, a camera focused on a person firing at the target, shutter means for the camera, normally de-energized illuminating means directed on said person, the target including a bull's eye which is depressible when hit, a timing arm mounted for swinging movement, detent means normally maintaining said timing arm in an inactive position and releasing said arm responsively to depression of the bull's eye, said timing arm being unbalanced whereby it partakes of swinging movement when released, and means responsive to movement of the timing arm for effecting energization of the illuminating means and actuation of said shutter means in predetermined timed relationship.

6. Apparatus of the character described comprising, in combination, a target, a camera focused on a person firing at the target, shutter means for the camera, normally de-energized illuminating means directed on said person, the target including a bull's eye which is depressible when hit by a projectile fired at the target, normally open switch means adapted to be closed by depression of the bull's eye, a solenoid controlled by said switch means, a detent normally disposed in an active position and retractible when the solenoid is energized, a timing arm normally maintained in an inactive position by said detent, said timing arm being mounted for swinging movement and being unbalanced whereby it partakes of such movement when the detent is retracted, and normally open switch means arranged in the path of movement of said arm and adapted to be closed and reopened responsively to such movement, one switch means controlling energization of said illuminating means, and the other switch means controlling actuation of said shutter means.

7. Apparatus as set forth in claim 6, wherein said switch means are so disposed that the timing arm effects closing of said one switch means prior to the closing of said other switch means and reopening of said one switch means subsequent to the reopening of said other switch means.

8. Apparatus of the character described comprising, in combination, a target, a camera focused on a person firing at the target, shutter means for the camera, normally de-energized illuminating means directed on said person, a target including a depressible bull's eye, a detent retractible responsively to depression of said bull's eye, a timing arm normally maintained in inactive position by said detent, said lever arm being mounted for swinging movement and being unbalanced whereby to partake of said movement upon retraction of the detent, two normally open switch means disposed in the path of movement of the timing arm and adapted to be closed when engaged by said arm and to reopen automatically upon movement of said arm past the same, said switches being disposed relatively to said timing arm so that one switch means is closed prior to the closing of the other switch means and is reopened subsequent to the reopening of said other switch means, said one switch means controlling said illuminating means and said other switch means controlling said shutter means.

9. Apparatus of the character described comprising, in combination, a target, a camera focused on a person firing at the target, shutter means for the camera, normally de-energized illuminating means directed on said person, a target including a depressible bull's eye, a detent retractible responsively to depression of said bull's eye, a timing arm normally maintained in an inactive position in said detent, said timing arm being pivoted intermediate its ends and closer to one end than to the other, whereby it is unbalanced and tends to move angularly about its fulcrum point upon retraction of said detent, a first switch means in the path of movement of the shorter end of said timing arm for controlling said illuminating means, a second switch means in the path of movement of the longer end of said timing arm for controlling actuation of said shutter means, both said switch means being normally open and being adapted to be closed when engaged by said arm, the arrangement being such that said switch means in the path of the shorter end of the arm is engaged thereby prior to engagement of the other switch means by the longer end of the arm.

10. Apparatus of the character described comprising a combined target and camera guard plate, a camera mounted rearwardly of said plate and laterally of said target, said camera having a front member provided with a light opening, said plate having an opening registering with said light opening, a shutter disposed rearwardly of said front and having a normal position in which it covers said front opening, a protective flap disposed forwardly of said plate and having a normal position in which it covers said plate opening, normally ineffective means for actuating said shutter and flap to opening uncovering positions, and means for rendering said last means effective including an arm mounted for angular movement, means responsive to a target hit for initiating movement of said arm, and means responsive to movement of said arm for energizing said normally ineffective means.

11. Apparatus of the character described comprising, in combination, a camera, a hood enclosing said camera, a depressible member, electro-mechanical means for actuating said camera in response to depression of said member, said means including an arm enclosed within the hood and being mounted for swinging movement from a first to a second position, latching means normally securing the arm in said first position and being rendered inoperative upon depression of the depressible member, means for indicating the positions of said arm, and manual means for resetting said arm in its first position following movement thereof to its second position, both said last means being operative exteriorly of the hood.

12. Apparatus of the character described comprising, in combination, a camera, a depressible member, electro-mechanical means for actuating said camera in response to depression of said member, said means including an arm mounted for swinging movement from a first to a second position, latching means normally securing the arm in said first position and being rendered inoperative upon depression of the depressible member, normally open switches disposed in the path of movement of said arm and being closeable when engaged by said arm, circuits controlled by said switch means, a supply circuit for said first-named circuits, switch means for said supply circuit, and means including said arm and said last switch means for effecting closing of the supply circuit when the arm is in its first position and for effecting opening of said supply circuit when the arm is in its second position.

13. In a target-controlled camera with subject lighting means, mechanism for translating a hit on the target into energization of the lighting means and actuation of the camera comprising, in combination, an unbalanced timing arm pivoted intermediate its ends, means normally operative to maintain said arm in an inactive position and being rendered inoperative responsively to a hit on the target, whereupon said arm partakes of swinging movement due to its unbalance, first and second switch means disposed in the path of movement of and being engageable by the ends of said timing arm for controlling, respectively, energization of the lighting means and actuation of the camera, said switch means being positioned relatively to each other and to said timing arm so that the first switch means is engaged a short interval prior to engagement of the second switch means, and an arcuate extension on the end of the timing arm which engages the first switch means for maintaining said engagement until the other end of the arm has disengaged from said second switch means.

DAVID P. KEEFE.

REFERENCES CITED

The following references are of record in the file of this patent:

UNITED STATES PATENTS

| Number | Name | Date |
| --- | --- | --- |
| 1,545,421 | Giacobi | July 7, 1925 |
| 1,712,550 | Chaussier | May 14, 1929 |